United States Patent [19]

Chamberlin et al.

[11] Patent Number: 5,125,511
[45] Date of Patent: Jun. 30, 1992

[54] BLOW MOLDED BOX

[75] Inventors: Davis W. Chamberlin; Gerald J. Niles; Carl S. Ahlberg, all of St. Paul, Minn.

[73] Assignee: Minnesota Mining and Manufacturing Company, St. Paul, Minn.

[21] Appl. No.: 860,138

[22] Filed: May 6, 1986

[51] Int. Cl.⁵ .............................................. B65D 21/02
[52] U.S. Cl. .................................. 206/509; 220/339; 220/675
[58] Field of Search ................. 220/72, 337, 339, 675; 206/509, 387; 150/55

[56] References Cited

U.S. PATENT DOCUMENTS

| | | | |
|---|---|---|---|
| 3,406,855 | 10/1986 | McKechnie | 206/509 |
| 3,663,990 | 5/1972 | Shane | 220/337 |
| 3,701,456 | 10/1972 | Alroy | 150/55 |
| 4,005,800 | 2/1977 | Schurman | 220/337 |
| 4,153,178 | 5/1979 | Weavers . | |
| 4,177,896 | 12/1979 | Weavers et al. . | |
| 4,211,337 | 7/1980 | Weavers et al. . | |
| 4,308,966 | 1/1982 | Ettema | 220/21 |
| 4,589,551 | 5/1986 | Hellon | 206/509 |

Primary Examiner—Stephen Marcus
Attorney, Agent, or Firm—Gary L. Griswold; Walter N. Kirn; William L. Huebsch

[57] ABSTRACT

A blow molded box having (1) corner structures including hollow post-like supports against an outer polymeric sheet defining the corner, which supports are formed in inner polymeric sheets defining the inner surfaces of the intersecting walls at the corner; (2) dust resistant hinge that has central parts that engage when the box is opened or closed to retain the relative positions of those central parts against radial movement; and (3) locating portions on the sidewalls of the box that engage mating locating portions on the sidewalls of adjacent similar boxes to restrict slippage between the boxes and facilitate carrying a stack of the boxes, but which are resiliently flexible so that they do not greatly restrict removing the box from between adjacent boxes stored side by side on a shelf or hanging from a support member.

23 Claims, 4 Drawing Sheets

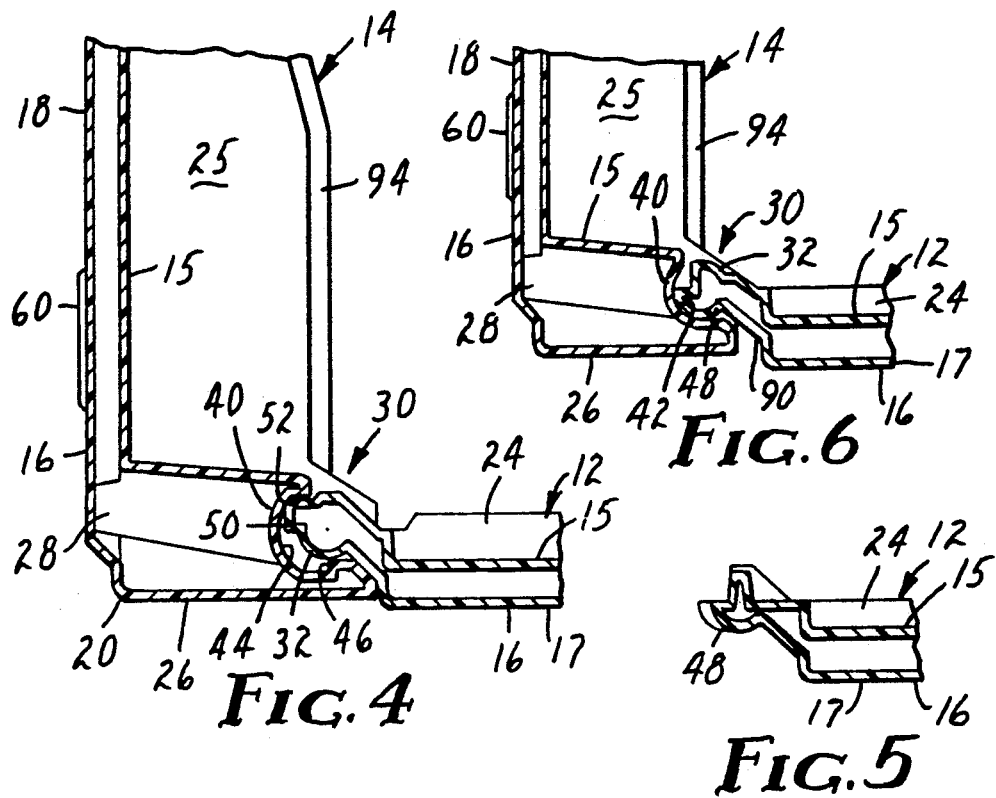
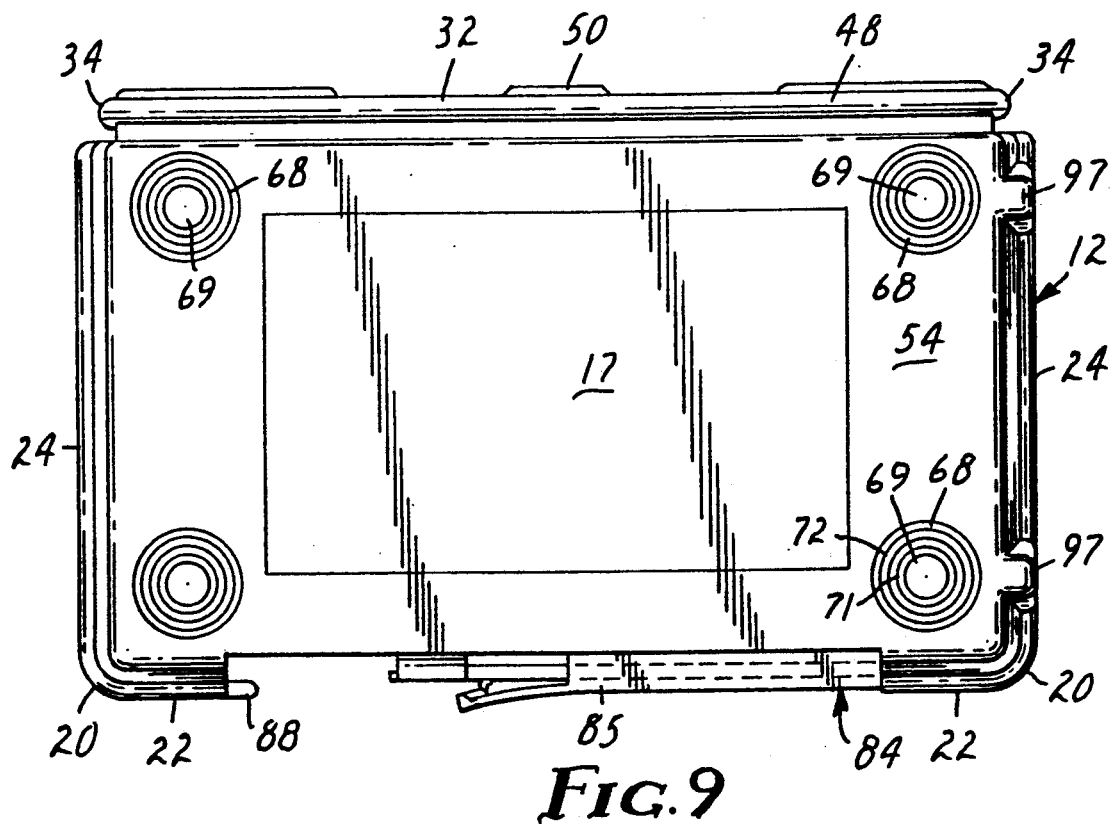

BLOW MOLDED BOX

FIELD OF THE INVENTION

This invention concerns blow molded plastic storage and shipping boxes of double wall construction.

BACKGROUND OF THE INVENTION

Blow molded boxes of double wall construction (i.e., having walls formed by inner and outer polymeric sheets spaced apart along most of their adjacent portions and connected together in spaced locations and along many of their edges) are widely used where economy, durability and light weight are desired. The light weight reduces shipping costs and the double wall construction provides cushioning against shocks.

One such two part blow molded box available from Minnesota Mining and Manufacturing Company, St. Paul, Minn., has been particularly adapted to protect videocassettes and has been constructed with a special hinge between the parts, a special double acting latch, and a recessed hook for hanging the boxes from a horizontal support member as is described respectively in U.S. Pat. Nos. 4,211,337; 4,153,178 and 4,177,896, the content whereof is incorporated herein by reference. While that box has achieved great acceptance, experience with the box in the field has shown a need to provide certain improvements.

Such boxes containing videocassettes undergo rough handling including being dropped or thrown, which has resulted in crushing in the outer polymeric sheet forming the walls at a corner of the box. Such corner crushing is not only unsightly, but can also cause torsional forces in and deform the box part on which the crushed corner is formed so that it will no longer properly engage a mating part to close the box.

More dust than may be desired has found its way into the closed boxes, particularly through the hinge portions.

Also, it has been found difficult to carry a large stack of the boxes due to slippage between the relatively slippery and generally planar side surfaces of the boxes.

SUMMARY OF THE INVENTION

The improved blow molded box according to the present invention provides (1) novel corner structures that restrict crushing and resultant deformation of box parts on which the corners are formed; (2) a hinge structure that greatly restricts entrance of dust through the hinge when the box is closed; and (3) locating portions on the sidewalls of the box that engage mating locating portions on the sidewalls of adjacent similar boxes to facilitate carrying a stack of the boxes, but which do not greatly restrict removing the box from between adjacent boxes stored side by side on a shelf or hanging from a support member.

According to the present invention there is provided a molded box of the type having first and second or base and cover parts each having inner and outer spaced polymeric sheets defining a sidewall and edge walls projecting generally at right angles from the sidewall and intersecting each other to define corners for the box. In the box according to the present invention, the inner sheets at the intersection of the side and edge walls defining the corner are formed into a hollow post-like support (preferably generally in the shape of a frustum) projecting at a right angle to and contacting the outer sheet of the sidewall in the corner to restrict deformation of the outer sheet at the corner. Using this corner support structure it has been found that deformation of the corners can be restricted compared to the above described boxes without the post-like support, even when the boxes with the post-like support are formed of significantly thinner polymeric sheets.

Also, the hinge means between the parts of the box according to the present invention comprises a spine extending along one edge of a sidewall of the base part and a pair of aligned hinge pins projecting outwardly from ends of the spine and defining an axis for the hinge means; and the cover part of the box including spaced opposed hinge portions projecting generally at right angles from the sidewall of the cover part and having openings receiving the hinge pins. The cover part includes a rear wall projecting generally normal to its sidewall and extending between the hinge portions, the spine and the rear wall are continuous and adapted to fit closely together between the hinge portions in the closed position of the parts, and the spine and rear wall include locking means adapted for engagement when the parts are in their closed position to restrict relative movement between the spine and the rear wall in essentially all directions normal to the axis. This hinge structure restricts dust from entering the box to a greater degree than does the hinge structure described in U.S. Pat. No. 4,211,337 when the box is closed, and still provides support along the center of the spine between the hinge pins to restrict deformation of the spine in that area when the box is closed. Such deformation, if excessive, might allow dust to enter the box or the hinge pins to move out of the openings.

Preferably, the locking means comprises a channel on the cover part along the rear wall, which channel has a generally semi-cylindrical inner surface generally coaxial with the axis of the hinge means and opening away from the sidewall of the cover part, and a recess from the semi-cylindrical inner surface partially defined by an end locking surface facing and generally parallel to the sidewall of the cover part. The spine has an elongate portion and a projection from one side of the elongate portion. The elongate portion is positioned along the semi-cylindrical inner surface and the projection is positioned in the recess to abut the end surface when the parts are in their closed position so that engagement of the central portion of the spine with the semi-cylindrical inner surface and engagement of the projection with the end surface will both restrict deformation of the central portion of the spine when the box is closed.

Also, preferably the end of the recess opposite the locking surface is defined by a second locking surface disposed at a right angle to the sidewall of the cover part, and the elongate portion of the spine is received along the semi-cylidrical inner surface and the projection is positioned against the second end surface when the parts are in the open position to help restrict deformation of the central portion of the spine when the box is open.

Additionally a first sidewall of the box preferably has a plurality of (e.g., four) first locating portions each including a recessed center portion having an outer surface recessed slightly (e.g., 0.027 inch) from the outer side surface of the first sidewall, and the first sidewall is corrugated outwardly around the center portion to define a ridge around the center portion having an outer surface raised slightly (e.g., 0.027 inch) from the outer side surface of the first sidewall and to define a recess from the outer side surface of the first sidewall around the ridge; and a second sidewall has a plurality of (e.g., four) second locating portions each including a raised central portion having an outer surface raised slightly (e.g., 0.027 inch) above the outer surface of the second sidewall, and the second sidewall is corrugated outwardly around the raised central portion to define inner and outer recesses from the outer surface of the second wall around the raised central portion. The first and second locating portions are positioned and sized to nest and locate sidewalls of adjacent storage boxes so that a stack of the boxes will stay in place while they are being carried. The corrugated portions of the sidewall, however, are sufficiently flexible and provide a camming action on each other so that they will deflect inwardly of the box and move out of engagement with each other to afford separating of the first and second locating portions so that the box can be slid from between adjacent boxes stored close together on a shelf or hanging from a support without further separating the side surfaces of those adjacent boxes.

Preferably the raised and recessed central portions are circular and the corrugations extend in concentric circular patterns of increasing diameter around the central portions.

BRIEF DESCRIPTION OF THE DRAWING

The present invention will be more thoroughly described with reference to the accompanying drawing where like numbers refer to like parts in the several views and wherein:

FIG. 4 is an enlarged fragmentary sectional view taken approximately along lines 4—4 of FIGS. 2 and 3 after the first and second parts of the box are assembled as shown in FIG. 1;

FIG. 5 is an enlarged fragmentary sectional view taken approximately along line 5—5 of FIG. 2;

FIG. 6 is an enlarged fragmentary sectional view taken approximately along lines 6—6 of FIG. 2 and 3 after the first and second parts of the box are assembled as shown in FIG. 1;

FIG. 9 is an outer surface plan view of the first part of the box shown in FIGS. 1 and 2;

DETAILED DESCRIPTION

Figure 1:
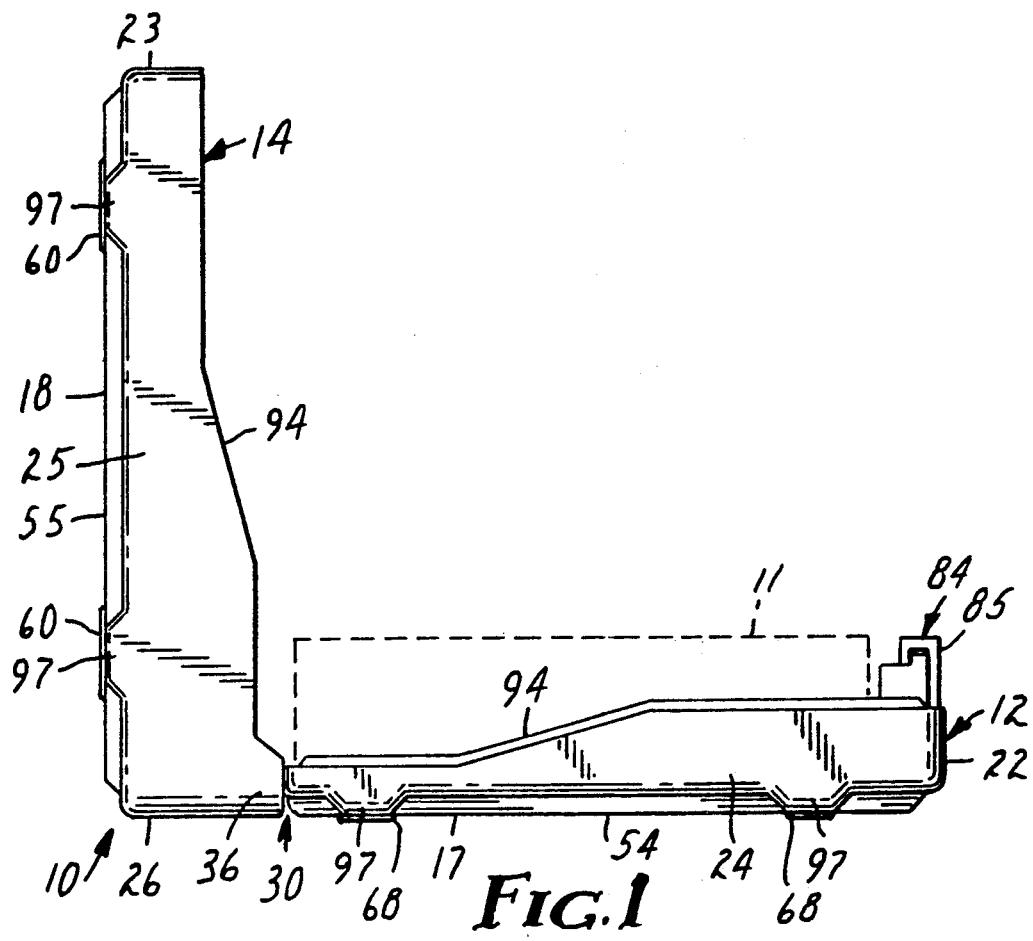
FIG. 1 is an end view of a blow molded box according to the present invention shown in an open position.

Referring now to the drawing there is shown a blow molded box according to the present invention generally designated by the reference numeral 10.

The box 10 illustrated is particularly adapted to hold a videocassette 11 shown in dotted outline in FIG. 1, but could be adapted to contain many different items.

The molded box 10 is of the type having a first or base part 12 and a second or cover part 14 each of which parts 12, 14 is formed by inner and outer polymeric sheets 15 and 16 spaced apart along most of their adjacent portions and connected together in spaced locations such as at support points 13 and along many of their edges to define sidewalls 17 and 18 for the base and cover parts 12 and 14 respectively, and edge walls projecting generally at right angles to the sidewalls 17 and 18 and intersecting to define corners 20 of the box 10. These edge walls include mating front wall portions 22 and 23 on the parts 12 and 14 respectively, mating edge wall portions 24 and 25 on the parts 12 and 14 respectively, and a rear wall 26 on the cover part 14.

Figure 8:
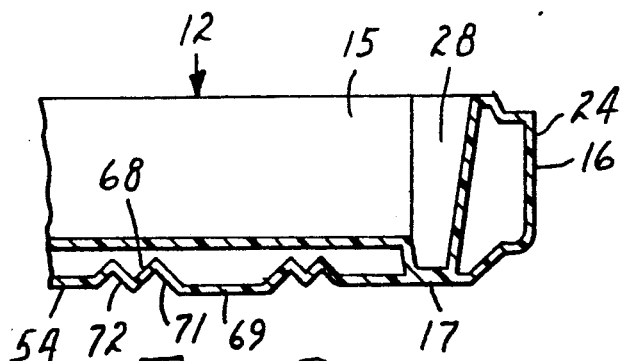
FIG. 8 is an enlarged fragmentary sectional view taken approximately along line 8—8 of FIG. 2.

In the improved box 10, the inner sheets 15 at the intersection of the side and edge walls defining the corners 20 are formed by the molding process into hollow post-like parts 28 (see FIG. 8) each in the shape of a hollow frustum with a circular cross section that is open along one side and projecting at a right angle to and contacting the outer sheet 16 of the sidewall 17 or 18 in one of the corners 20 to restrict deformation of the outer sheet 16 at that corner 20.

Novel hinge means 30 are also provided between the parts 12 and 14 for affording relative pivotal movement of the parts 12 and 14 between open and closed positions. The hinge means 30 comprises a spine 32 extending along one edge of the sidewall 17 of the base part 12, and a pair of aligned hinge pins 34 projecting outwardly from ends of the spine 32 and defining an axis for the hinge means 30. The cover part 14 of the box 10 includes spaced opposed hinge portions 36 formed in the edge wall portions 25 that project generally at right angles from the sidewall 18 of the cover part 14 and have openings 38 receiving the hinge pins 34. The cover part 14 includes the rear wall 26 which projects generally normal to the sidewall 18 of the cover part 14 and extends between the hinge portions 36. The spine 32 and the rear wall 26 are continuous and are adapted to fit closely together between the hinge portions 36 in the closed position of the parts 12 and 14 to restrict the entrance of dust therebetween. Also, the spine 32 and the rear wall 26 include locking means adapted for engagement when the parts 12 and 14 are in their closed position to restrict relative movement between the spine 32 and the rear wall 26 in essentially all directions normal to the axis of the spine 32.

The locking means (see FIGS. 2, 3, 4 and 6) comprises a channel 40 included in the rear wall 26. The channel 40 has a generally semi-cylindrical inner surface 42 generally coaxial with the axis of the hinge means 30 and opening away from the sidewall 18 of the cover part 14, and a recess 44 from the semi-cylindrical inner surface 42 partially defined by an end locking surface 46 facing and generally parallel to the sidewall 18 of the cover part 14, and the spine 32 having an elongate portion 48 and a projection 50 from one side of the elongate portion 48. The elongate portion 48 is positioned along the semi-cylindrical inner surface 42 and the projection 50 is positioned to abut the end surface 46 when the parts 12 and 14 are in their closed position.

The projection 50 moves freely along the arcuate recess 44 as the parts 12 and 14 move between their closed and open positions, and the end of the recess 44 opposite the locking surface 46 is defined by a second locking surface 52 disposed at a right angle to the sidewall 18 of the cover part 14. The elongate portion 48 of the spine 32 is received along the semi-cylindrical inner surface 42 and the projection 50 is positioned against the second end surface 52 when the parts 12 and 14 are in their open position. This engagement then restricts deflection of the central portions of the spine 32 out of alignment with the axis of the hinge means 30 when the parts 12 and 14 are in their open position.

Figure 10:
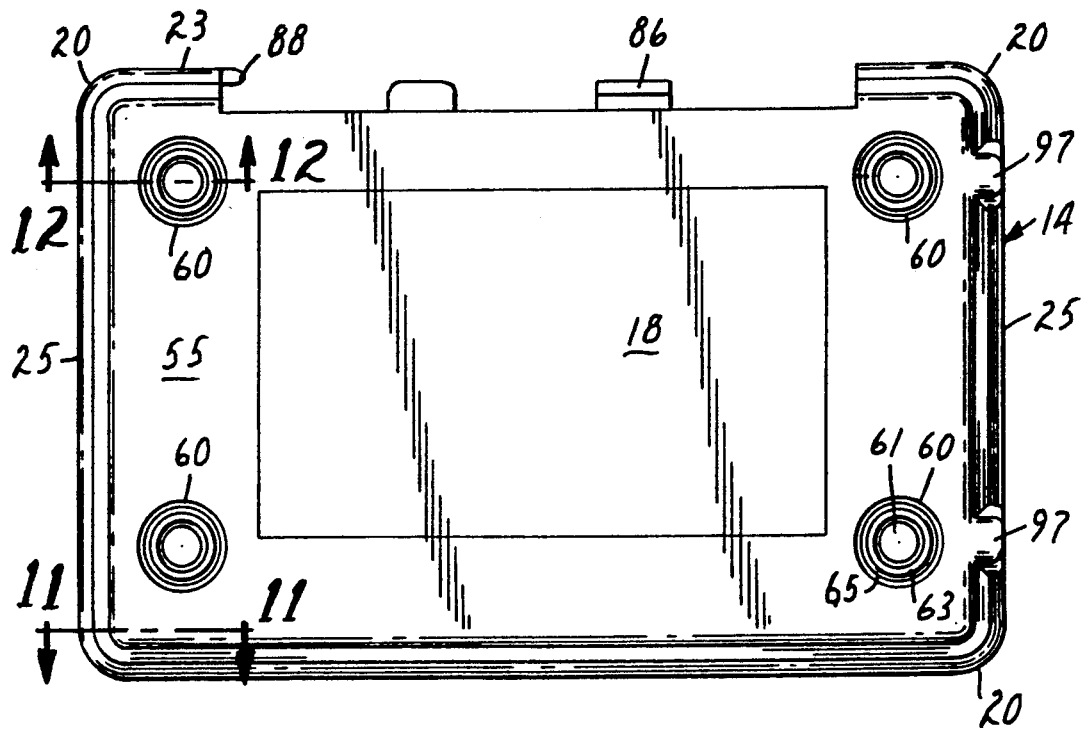
FIG. 10 is an outer surface plan view of the second part of the box shown in FIGS. 1 and 3.
Figure 11:
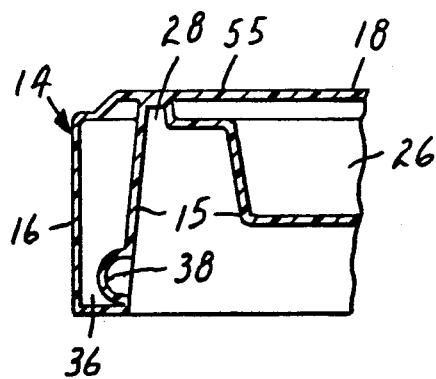
FIG. 11 is an enlarged fragmentary sectional view taken approximately along line 11—11 of FIG. 10.
Figure 12:
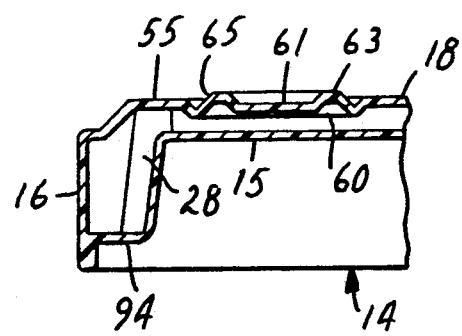
FIG. 12 is an enlarged fragmentary sectional view taken approximately along line 12—12 of FIG. 10.

The base and cover major sidewalls 17 and 18 have generally planar outer side surfaces 54 and 55 respectively, and like prior art boxes, the boxes 10 are adapted to be stored with their base and cover sidewalls 17 and 18 vertically upright, aligned with, and respectively contacting essentially identical cover and base sidewalls 18 and 17 of adjacent storage boxes 10 and to be carried in stacks when removed from such storage. The cover sidewall 18 has a plurality of cover or second locating portions 60 (FIGS. 10 and 12) each including a circular recessed center portion 61 having an outer surface recessed slightly from the outer side surface 55 of the cover sidewall 18. The outer sheet 16 of the cover sidewall 18 is corrugated radially outwardly around the center portion 61 to define an annular ridge 63 around the center portion 61, which ridge 63 has an outer surface raised slightly from the side surface 55 of the cover sidewall 18. The corrugations also define a recess 65 from the side surface 55 of the cover sidewall 18 around the ridge 63. The base sidewall 17 has a plurality of base or first locating portions 68 (FIGS. 9 and 8) each including a raised circular central portion 69 having a circular outer surface raised slightly above the side surface 54 of the base sidewall 17, the outer sheet 16 of the base sidewall 17 being corrugated radially outwardly around the raised central portion 69 to define inner and outer recesses 71 and 72 from the side surface 54 of the base sidewall 17 around the raised cental portion 69. The first and second locating portions 68 and 60 are positioned and sized to nest (FIG. 13) and locate the sidewalls 17 and 18 of adjacent storage boxes 10. The corrugated portions of the sidewalls 17 and 18 provide a camming action on each other and are sufficiently flexible to afford separating of the first and second locating portions 68 and 60 by deflecting them inwardly of the box 10 as the box 10 is slid from between closely adjacent boxes 10 in a direction parallel to its side surfaces 54 and 55 without further separating the side surfaces 54 and 55 of those adjacent boxes 10.

Figure 7:
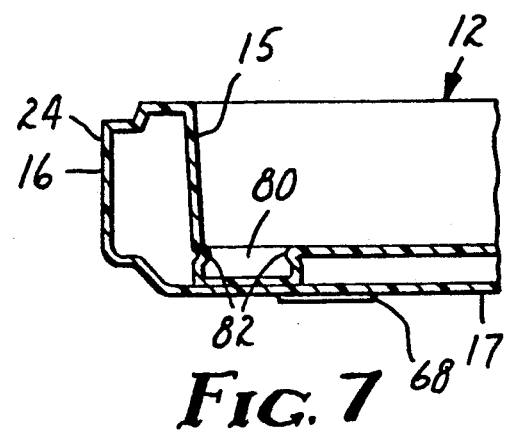
FIG. 7 is an enlarged fragmentary sectional view taken approximately along line 7—7 of FIG. 2.
Figure 3:
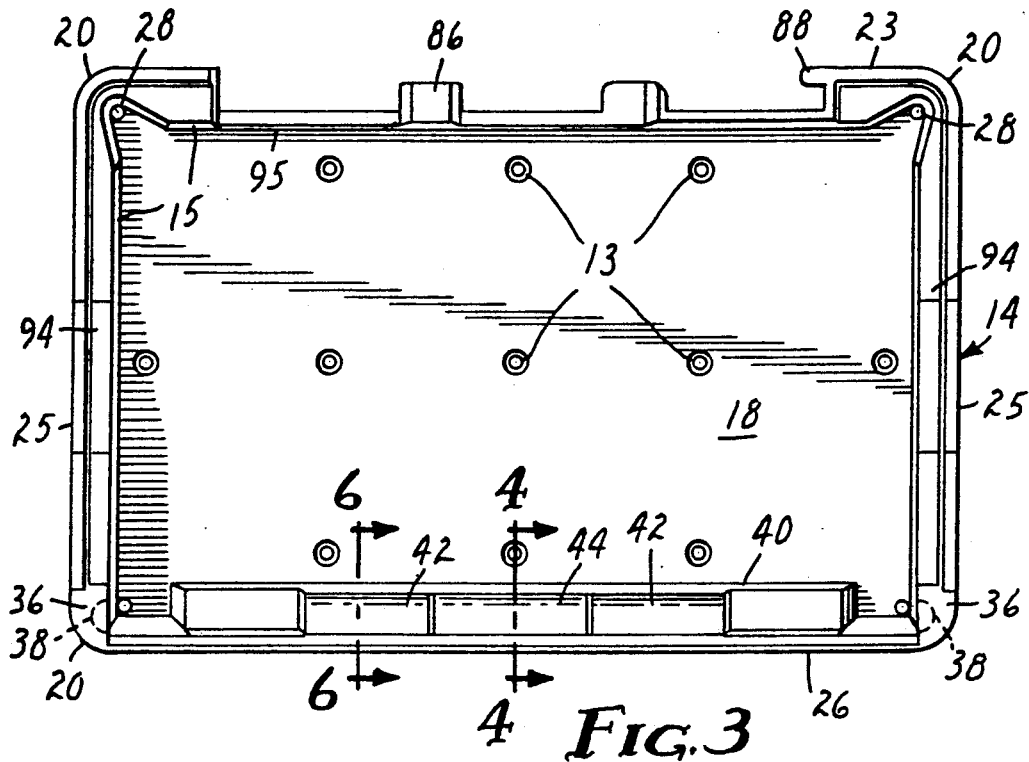
FIG. 3 is an inside surface plan view of a second part of the box of FIG. 1.
Figure 2:
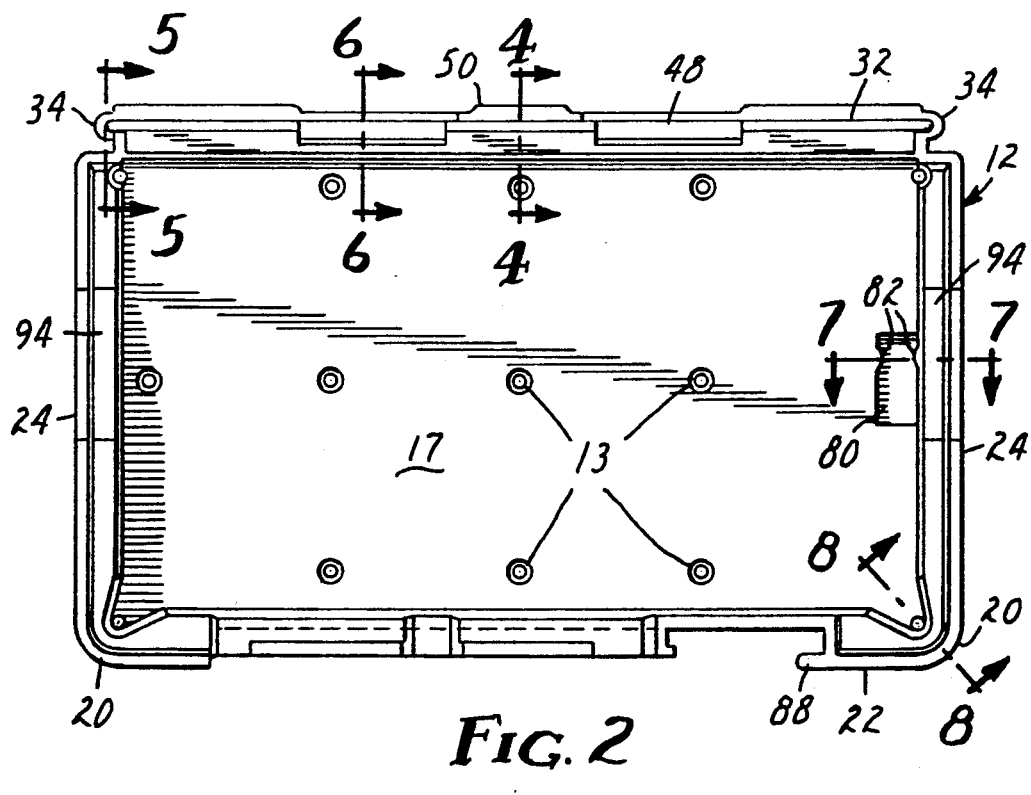
FIG. 2 is an inside surface plan view of a first part of the box of FIG. 1.

The base part 12 has a generally rectangular recess 80 (FIGS. 2 and 7) from its inner surface in which a removable record lockout tab (not shown) from a cassette may be stored when it is not in use on the cassette. Opposed retaining lips 82 project over one end of the recess 80 and are adapted to frictionally retain the tab therein.

The parts 12 and 14 of the box 10 may be releasably retained in their closed position by a latch assembly 84 (FIG. 9) including a slide 85 movably mounted on the front wall portion 22 and adapted to releasably engage a part 86 of the front wall portion 23, which latch assembly 84 is more fully described in U.S. Pat. No. 4,153,178 incorporated herein by reference.

The box 10 also includes a hook portion 88 partially formed on both front wall portions 22 and 23 of the box 10 and adapted for hanging the box 10 on a horizontal member (not shown) received through a recess 88 in the front wall portions 22 and 23 as is described in greater detail in U.S. Pat. No. 4,177,B96.

An outer surface portion 90 of the base part 12 along and adjacent the spine 32 in conjunction with the distal edge of the rear wall 26 form a groove that can receive a user's thumb or fingers when he grasps the closed box 10 around the rear wall 26 to facilitate holding the box 10. These surfaces of the base part 12 and rear wall 26 that form the groove are beveled away from each other when the box 10 is closed so that if a user keeps his fingers or thumb in the groove as the box 10 is opened, these beveled surfaces will cam his thumb or fingers out of the groove as it decreases in width to restrict pinching his thumb or fingers.

The edge wall portions 24 and 25 and outer parts of the front wall portions 22 and 23 have stepped mating surfaces 94 which restrict movement of dust therebetween when the cover and base parts 14 and 12 are closed. Also a small upstanding lip 95 is formed along the inner edge of the front wall portion 23, which lip 95 engages along the inner surface of the front wall portion 22 when the box 10 is closed to provide the same effect. These structures, together with the novel hinge means 30 described above, provide a very dust-tight closed box 10.

The edge wall portions 24 and 25 along one end of the box 10 are formed with abutments 97 which serve as legs to enable the box to stand on those edge wall portions 24 and 25.

A preferred plastic for the novel box 10 is high-density polyethylene which is commonly used for blow molding, is of low cost and has good toughness, resistance to degradation and shape retention while having adequate flexibility for easy assembly of the box 10 which can be done by bending the spine 32 slightly so that the hinge pins 34 can both be inserted into the openings 38.

The present invention has now been described with reference to one embodiment thereof. It will be apparent to those skilled in the art that many changes can be made in the embodiment described without departing from the scope of the present invention. Thus the scope of the present invention should not be limited to the structures described in this application, but only by structures described by the language of the claims and the equivalents of those structures.

We claim:

1. A molded plastic box comprising first and second parts having spaced inner and outer polymeric sheets defining first and second sidewalls and edge walls projecting generally at right angles to said sidewalls and intersecting to define corners for said box, said first and second parts being relatively movable between open and closed positions, and said inner sheets of said parts defining a central cavity enclosed by said first and second parts when said parts are in said closed position, wherein said inner sheets at the intersection of the side and edge walls defining the corners form hollow post-like parts generally in the shape of a frustum projecting at right angles to and supported against said outer sheets of the sidewalls in said corners to restrict deformation of said outer sheets at said corners.

2. A plastic box according to claim 1 wherein said hollow post-like parts generally have the shape of a conical frustum.

3. A plastic box according to claim 1 comprising hinge means between said parts for affording relative pivotal movement of said parts between open and closed positions, said hinge means comprising a spine extending along one edge of the sidewall of said first part and having opposite ends, a pair of aligned hinge pins projecting outwardly from the ends of said spine and defining an axis for said hinge means, and the second part of said box including spaced opposed hinge portions projecting generally at right angles from the sidewall of said second part and having openings receiving said hinge pins, wherein said second part includes a rear wall projecting generally normal to the sidewall of said second part and extending between said hinge portions, said spine and said rear wall are continuous and adapted to fit closely together between said hinge portions in the closed position of said parts and include locking means on said parts along said axis and located between said hinge pins and said hinge portions adapted for engagement when said parts are in said closed position to restrict relative movement between said spine and said rear wall in essentially all directions normal to said axis.

4. A plastic box according to claim 3 wherein said locking means comprises a channel on said second part and along said rear wall having a generally semi-cylindrical inner surface generally coaxial with said axis and opening away from the sidewall of said second part, and a recess from said semi-cylindrical inner surface partially defined by an end locking surface facing and generally parallel to the sidewall of said second part, and said spine having an elongate portion and a projection from one side of said elongate portion, said elongate portion being positioned along said semi-cylindrical inner surface and said projection being positioned to about said end surface when said parts are in said closed position.

5. A plastic box according to claim 4 wherein the end of said recess opposite said locking surfaces is defined by a second locking surface disposed at a right angle to the sidewall of said second part, the elongate portion of said spine being received along said semi-cylidrical inner surface and said projection being positioned against said second end surface when said parts are in said open position.

6. A plastic box according to claim 3 wherein said first and second sidewalls have generally planar outer side surfaces and said box is adapted to be stored with said first and second sidewalls aligned with and contacting essentially identical second and first sidewalls of adjacent storage boxes and to be carried in stacks when removed from storage, wherein the outer polymeric sheet included in said second sidewall has a plurality of second locating portions each including a recessed center portion having an outer surface recessed slightly from the outer side surface of said second sidewall, said outer polymeric sheet included in said second sidewall being corrugated outwardly around said center portion to define a ridge around said center portion having an outer surface raised slightly from said outer side surface of said second sidewall and to define a recess from the outer side surface of said second sidewall around said ridge; and the outer polymeric sheet included in said first sidewall has a plurality of first locating portions each including a raised central portion having an outer surface raised slightly above the outer surface of said first sidewall, the outer polymeric sheet included in said first sidewall being corrugated outwardly around said raised central portion to define inner and outer recesses from said outer surface of said first sidewall around said raised central portion, said first and second locating portions being positioned and sized to nest and locate sidewalls of adjacent storage boxes, and the corrugated portions of said sidewall being sufficiently flexible to afford separating of said first and second locating portions and afford movement of said box from between adjacent boxes in a direction parallel to said side surfaces without separating the side surface of those adjacent boxes.

7. A plastic box according to claim 6 wherein said raised and recessed central portions are circular and said corrugations extend in concentric circular patterns of increasing diameter around said central portions.

8. A plastic box according to claim 6 having four of said first locating portions on said first sidewall and four of said second locating portions on said second sidewall.

9. A plastic box according to claim 6 wherein said recessed outer surface is recessed about 0.027 inch below said outer surface of said first wall and said raised outer surface and outer surface of said raised rib are raised about 0.027 inch above said outer side surface.

10. A plastic box according to claim 1 wherein said first and second sidewalls have generally planar outer side surfaces and said box is adapted to be stored with said first and second sidewalls aligned with and contacting essentially identical second and first sidewalls of adjacent storage boxes and to be carried in stacks when removed from storage, wherein the outer polymeric sheet included in said second sidewall has a plurality of second locating portions each including a recessed center portion having an outer surface recessed slightly from the outer side surface of said second sidewall, said outer polymeric sheet included in said second sidewall being corrugated outwardly around said center portion to define a ridge around said center portion having an outer surface raised slightly from said outer side surface of said second sidewall and to define a recess from the outer side surface of said second sidewall around said ridge; and the outer polymeric sheet included in said first sidewall has a plurality of first locating portions each including a raised central portion having an outer surface raised slightly above the outer surface of said first sidewall, the outer polymeric sheet included in said first sidewall being corrugated outwardly around said raised central portion to define inner and outer recesses from said outer surface of said first sidewall around said raised central portion, said first and second locating portions being positioned and sized to nest and locate sidewalls of adjacent storage boxes, and the corrugated portions of said sidewall being sufficiently flexible to afford separating of said first and second locating portions and afford movement of said box from between adjacent boxes in a direction parallel to said side surfaces without separating the side surface of those adjacent boxes.

11. A plastic box according to claim 10 wherein said raised and recessed central portions are circular and said corrugations extend in concentric circular patterns of increasing diameter around said central portions.

12. A plastic box according to claim 10 having four of said first locating portions on said first sidewall and four of said second locating portions on said second sidewall.

13. A plastic box according to claim 10 wherein said recessed outer surface is recessed about 0.027 inch below said outer surface of said first wall and said raised outer surface and outer surface of said raised rib are raised about 0.027 inch above said outer side surfaces.

14. A plastic box having first and second parts comprising first and second sidewalls respectively, and hinge means between said parts for affording relative pivotal movement of said parts between open and closed positions, said hinge means comprising a spine extending along one edge of said first sidewall and having opposite ends, a pair of aligned hinge pins projecting outwardly from the ends of said spine and defining an axis for said hinge means, and the second part of said box including spaced opposed hinge portions projecting generally at right angles from said second sidewall and having openings receiving said hinge pins, wherein said second part includes a rear wall projecting generally normal to said second sidewall and extending between said hinge portions, said spine and said rear wall are continuous and adapted to fit closely together between said hinge portions in the closed position of said parts and include locking means on said parts along said axis and located between said hinge pins and said hinge portions adapted for engagement when said parts are in said closed position to restrict relative movement between said spine and said rear wall in essentially all directions normal to said axis, said locking means comprising a channel on said second part and along said rear wall having a generally semi-cylindrical inner surface generally coaxial with said axis and opening away from said second sidewall and a recess from said semi-cylindrical inner surface partially defined by an end locking surface facing and generally parallel to said second sidewall, and said spine having an elongate portion and a projection from one side of said elongate portion, said elongate portion being positioned along said semi-cylindrical inner surface and said projection being positioned to abut said end surface when said parts are in said closed position.

15. A plastic box according to claim 14 wherein the end of said recess opposite said locking surfaces is defined by a second locking surface disposed at a right angle to said second sidewall, the elongate portion of said spine being received along said semi-cylindrical inner surface and said projection being positioned against said second end surface when said parts are in said open position.

16. A plastic box having first and second parts comprising first and second sidewalls respectively, and hinge means between said parts for affording relative pivotal movement of said parts between open and closed positions, said hinge means comprising a spine extending along one edge of said first sidewall and having opposite ends, a pair of aligned hinge pins projecting outwardly from the ends of said spine and defining an axis for said hinge means, and the second part of said box including spaced opposed hinge portions projecting generally at right angles from said second sidewall and having openings receiving said hinge pins, wherein said second part includes a rear wall projecting generally normal to said second sidewall and extending between said hinge portions, said spine and said rear wall are continuous and adapted to fit closely together between said hinge portions in the closed position of said parts and include locking means on said parts along said axis and located between said hinge pins and said hinge portions adapted for engagement when said parts are in said closed position to restrict relative movement between said spine and said rear wall in essentially all directions normal to said axis, wherein said first and second sidewalls are defined by spaced inner and outer polymeric sheets, and have generally planar outer side surfaces, and said box is adapted to be stored with said first and second sidewalls aligned with and contacting essentially identical second and first sidewalls of adjacent storage boxes and to be carried in stacks when removed from storage, and wherein the outer polymeric sheet included in said second sidewall has a plurality of second locating portions each including a recessed center portion having an outer surface recessed slightly from the outer side surface of said second sidewall, said outer polymeric sheet included in said second sidewall being corrugated outwardly around said center portion to define a ridge around said center portion having an outer surface raised slightly from said outer side surface of said second sidewall and to define a recess from the outer side surface of said second sidewall around said ridge; and the outer polymeric sheet included in said first sidewall has a plurality of first locating portions each including a raised central portion having an outer surface raised slightly above the outer surface of said first sidewall, the outer polymeric sheet included in said first sidewall being corrugated outwardly around said raised central portion to define inner and outer recesses from said outer surface of said first sidewall around said raised central portion, said first and second locating portions being positioned and sized to nest and locate sidewalls of adjacent storage boxes, and the corrugated portions of said sidewalls being sufficiently flexible to afford separating of said first and second locating portions and afford movement of said box from between adjacent boxes in a direction parallel to said side surfaces without separating the side surface of those adjacent boxes.

17. A plastic box according to claim 16 wherein said raised and recessed central portions are circular and said corrugations extend in concentric circular patterns of increasing diameter around said central portions.

18. A plastic box according to claim 16 having four of said first locating portions on said first sidewall and four of said second locating portions on said second sidewall.

19. A plastic box according to claim 16 wherein said recessed outer surface is recessed about 0.027 inch below said outer surface of said first wall and said raised outer surface and outer surface of said raised rib are raised about 0.027 inch above said outer side surface.

20. A plastic box having walls including first and second major sidewalls having generally planar outer side surfaces and adapted to be stored with said first and second sidewalls upright, aligned with and contacting essentially identical second and first sidewalls of adjacent storage boxes and to be carried in stacks when removed from storage, wherein said second sidewall has a plurality of second locating portions each including a recessed center portion having an outer surface recessed slightly from the outer side surface of said second sidewall, said second sidewall being corrugated outwardly around said center portion to define a ridge around said center portion having an outer surface raised slightly from said outer side surface of said second sidewall and to define a recess from the outer side surface of said second sidewall around said ridge; and said first sidewall has a plurality of first locating portions each including a raised central portion having an outer surface raised slightly above the outer surface of said first sidewall, said first sidewall being corrugated outwardly around said raised central portion to define inner and outer recesses from said outer surface of said first sidewall around said raised central portion, said first and second locating portions being positioned and sized to nest and locate sidewalls of adjacent storage boxes, and the corrugated portions of said sidewalls being sufficiently flexible to afford separating of said first and second locating portions and afford movement of said box from between adjacent boxes in a direction parallel to said side surfaces without separating the side surface of those adjacent boxes.

21. A plastic box according to claim 20 wherein said raised and recessed central portions are circular and said corrugations extend in concentric circular patterns of increasing diameter around said central portions.

22. A plastic box according to claim 20 having four of said first locating portions on said first sidewall and four of said second locating portions on said second sidewall.

23. A plastic box according to claim 20 wherein said recessed outer surface is recessed about 0.027 inch below said outer surface of said first wall and said raised outer surface and outer surface of said raised rib are raised about 0.027 inch above said outer side surface.

* * * * *